(12) United States Patent
Fladhammer

(10) Patent No.: US 10,351,046 B2
(45) Date of Patent: Jul. 16, 2019

(54) LAMP ADJUSTER DEVICE AND METHOD OF USE

(71) Applicant: Asyst Technologies, LLC, Kenosha, WI (US)

(72) Inventor: Scott Fladhammer, Racine, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 0 days.

(21) Appl. No.: 15/836,376

(22) Filed: Dec. 8, 2017

(65) Prior Publication Data

US 2019/0176681 A1 Jun. 13, 2019

(51) Int. Cl.
*B60Q 1/068* (2006.01)
(52) U.S. Cl.
CPC .................................. *B60Q 1/0683* (2013.01)
(58) Field of Classification Search
CPC .................................................... B60Q 1/0683
USPC .................................................. 362/514, 524
See application file for complete search history.

(56) References Cited

U.S. PATENT DOCUMENTS

| 4,574,334 A | 3/1986 | Igura |
| 4,930,367 A | 6/1990 | Nagasawa |
| 4,939,945 A | 7/1990 | Ryder et al. |
| 5,003,436 A | 3/1991 | Yamada et al. |
| 5,077,642 A | 12/1991 | Lisak |
| 5,079,676 A | 1/1992 | Lisak |
| 5,163,746 A | 11/1992 | Lisak |
| 5,165,775 A | 11/1992 | Lisak et al. |
| 5,214,971 A | 6/1993 | Burton et al. |
| 5,309,780 A | 5/1994 | Schmitt |
| 5,355,287 A | 10/1994 | Denley |
| 5,365,415 A | 11/1994 | Schmitt et al. |
| 5,381,317 A | 1/1995 | Schmitt et al. |
| 5,444,603 A | 8/1995 | Otsuka et al. |
| 5,508,896 A | 4/1996 | Suehiro et al. |

(Continued)

FOREIGN PATENT DOCUMENTS

| DE | 3836094 | 4/1990 |
| DE | 10345336 | 4/2005 |

(Continued)

OTHER PUBLICATIONS

European Search Report dated Mar. 5, 2009.

*Primary Examiner* — Allyson N Trail
(74) *Attorney, Agent, or Firm* — James Joyce; Godfrey & Kahn, S.C.

(57) ABSTRACT

A lamp adjuster is provided that includes a housing having a first adjustment point and a nose, a gear having an extended cylindrical portion, an output shaft disposed longitudinally within the housing, the output shaft having a first threaded portion and a second threaded portion, a first channel and a first retraction stop. The adjuster further including a first housing tang extending from the nose, the first retraction stop engageable with the first housing tang to prevent further retraction of the output shaft, and wherein the first threaded portion has a major thread diameter greater than a major thread diameter of the second threaded portion, and the first and second threaded portions functionally engage the threaded interior of the extended cylindrical portion, and a clutching slot provided at the first threaded portion to allow for selective disengagement of the first threaded portion from the partially threaded interior.

20 Claims, 8 Drawing Sheets

(56) References Cited

U.S. PATENT DOCUMENTS

| | | | |
|---|---|---|---|
| 5,546,283 A | 8/1996 | Otsuka et al. | |
| 5,647,659 A | 7/1997 | Mori | |
| 5,697,692 A | 12/1997 | Hoffman et al. | |
| 5,707,133 A | 1/1998 | Burton | |
| 5,707,134 A | 1/1998 | Nishizawa | |
| 5,741,059 A | 4/1998 | Kusagaya | |
| 5,746,559 A | 5/1998 | Shirai | |
| 5,775,795 A | 7/1998 | Christian et al. | |
| 5,951,157 A | 9/1999 | Shirai et al. | |
| 6,161,950 A | 12/2000 | Tsukamoto et al. | |
| 6,231,223 B1 | 5/2001 | Zucar et al. | |
| 6,257,747 B1 | 7/2001 | Burton | |
| 6,260,993 B1 | 7/2001 | Ito | |
| 6,290,379 B1 | 9/2001 | Iwasaki et al. | |
| 6,474,850 B1 | 11/2002 | Burton | |
| 6,773,153 B2 | 8/2004 | Burton | |
| 6,913,374 B2 | 7/2005 | Burton | |
| 6,918,687 B2 | 7/2005 | Deguchi | |
| 7,118,259 B2 | 10/2006 | Fladhammer | |
| 7,762,686 B2 * | 7/2010 | Fladhammer | B60Q 1/0683 362/273 |
| 2016/0047519 A1 * | 2/2016 | Shibata | B60Q 1/0094 362/512 |
| 2018/0170246 A1 * | 6/2018 | Burton | B60Q 1/0408 |

FOREIGN PATENT DOCUMENTS

| | | |
|---|---|---|
| EP | 0384838 | 2/1990 |
| EP | 0759377 | 6/1996 |

\* cited by examiner

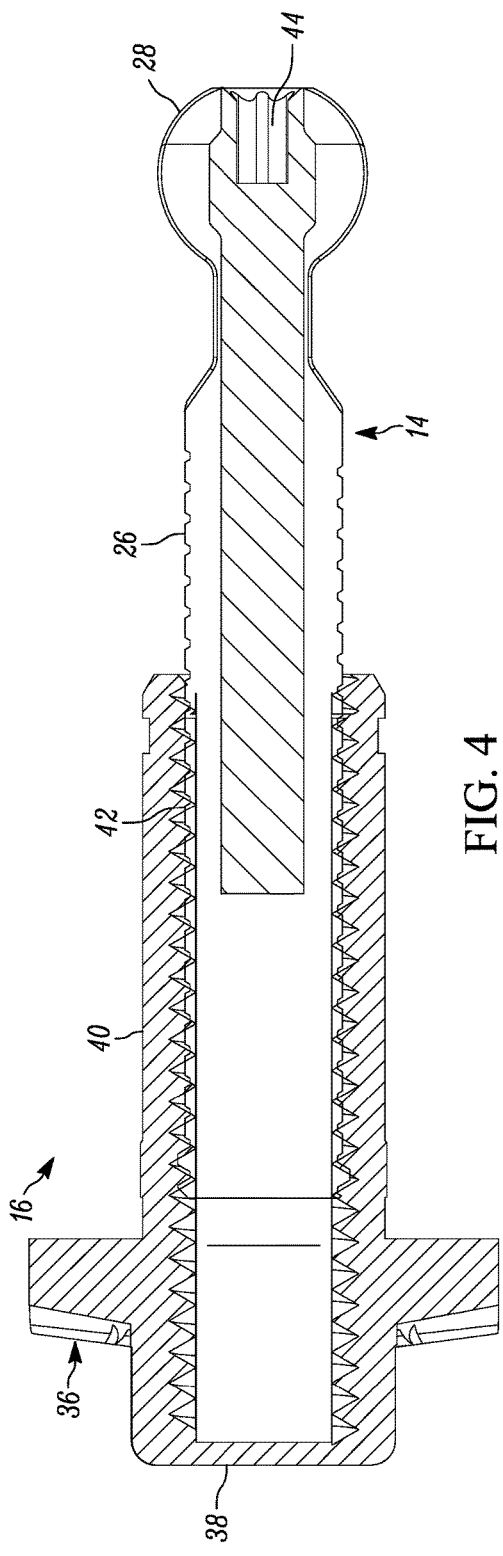
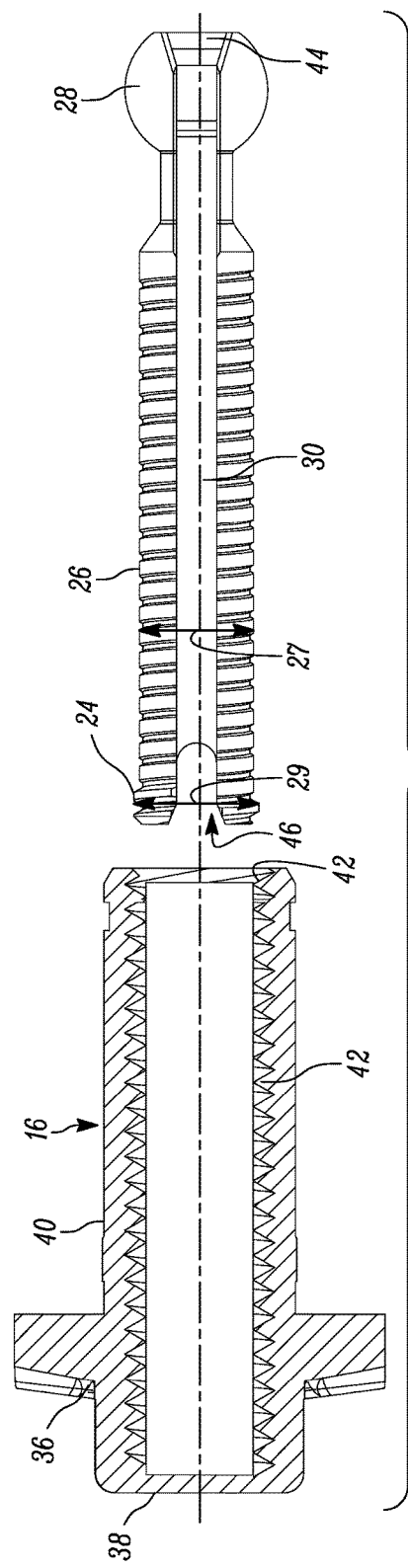
FIG. 4
FIG. 5

LAMP ADJUSTER DEVICE AND METHOD OF USE

FIELD

The lamp adjuster relates generally to adjusters that are used to adjust the aim of a vehicle lamp.

BACKGROUND OF THE INVENTION

Vehicles such as automobiles typically have several lamps including head lamps and fog lamps. These lamps generally include a housing supporting a reflector and a lens with a bulb mounted therebetween, and are often securely fit into mounting brackets attached to the vehicle. Together, a lamp and a mounting bracket form a complete lamp assembly. Once the lamp assembly has been manufactured and installed into a vehicle, the lamp must be adjusted to the proper aim. As a result of accidents, maintenance, and normal vibrations and wear, the aim of the lamp must be occasionally adjusted during the lifetime of the vehicle as well.

One method of adjusting the aim of the lamp involves using an adjuster. The adjuster may be formed as part of the mounting bracket or may be a separate part that communicates with both the lamp and the mounting bracket. One known type of adjuster comprises a housing and an output shaft extending therefrom. The output shaft is engaged to the lamp. Actuation or operation of the adjuster causes the output shaft to move with respect to the lamp assembly. Such movement causes the lamp to pivot or otherwise move with respect to the mounting bracket, thereby adjusting the aim of the lamp.

One example of this type of adjuster, disclosed in U.S. Pat. No. 6,257,747 to Burton, requires manual operation. The housing of the adjuster has an opening and a gear positioned inside the housing. The gear is functionally engaged to the output shaft. An input shaft is inserted into the opening and interacts with the gear. Actuation of the input shaft results in rotation of the gear and engaged output shaft. The gear translates actuation of the input shaft into movement of the output shaft. Numerous variations and improvements exist on this concept.

Due to the range of lamp assemblies and vehicles, adjusters that can be used in connection with several different lamp assemblies and vehicles are desirable. Most currently available adjusters have a single accessible adjustment point, namely, the input shaft. A range of input shaft configurations are currently available, for example, the Burton '747 patent referenced above discloses an adjuster having an input shaft disposed perpendicular to the output shaft and U.S. Pat. Nos. 6,474,850 and 6,913,374, both to Burton, disclose an adjuster having an input shaft disposed parallel to the output shaft. While the Burton designs are very effective for many applications, they all provide a single adjustment point and require the use of a different adjuster if a different adjustment point location is required for a particular application. As well, they do not provide the flexibility or convenience that would accompany a single adjuster capable of being adjusted at multiple points.

Accordingly, a need exists for an improved lamp adjuster that solves these and other deficiencies in the prior art. Of course, the lamp adjuster may be used in a multitude of situations where similar performance capabilities are required.

SUMMARY OF THE INVENTION

The lamp adjuster provides a cost-effective adjuster with improved functionality, and which solves certain of the problems raised or not solved by existing designs.

The lamp adjuster includes a housing having a first adjustment point, a gear having a second adjustment point and an extended cylindrical portion, an output shaft disposed at least partially within and functionally engaging the extended cylindrical portion and having a ball stud disposed at one end thereof. Movement of the output shaft can be effected using either the first adjustment point or the second adjustment point.

The adjuster may further include a clutching feature. The clutching feature includes a first threaded portion and a second threaded portion on the output shaft, wherein the first threaded portion has a major diameter greater than that of the second threaded portion, and has a clutching slot disposed thereon. The first threaded portion of the output shaft and the extended cylindrical portion of the gear are in full thread-to-thread engagement and the second threaded portion and the extended cylindrical portion are in minimal engagement. The clutching slot allows the first threaded portion to flex inward and disengage from the extended cylindrical portion in response to excessive resistance to linear movement at any point along the travel path of the output shaft. The minimal engagement between the second threaded portion and the extended cylindrical portion, as opposed to no engagement, supports the output shaft in the extended cylindrical portion to minimize side-to-side deflection of the output shaft.

The lamp adjuster also contemplates a lamp for a vehicle. The lamp can include a lamp housing, a lens supported by the housing, a reflector supported by the housing, a bulb disposed between the lens and the reflector, and an adjuster functionally engaged to the reflector. The adjuster includes a housing, at least two adjustment points, a gear, and an output shaft having a first threaded portion and a second threaded portion, wherein the first threaded portion has a major diameter greater than that of the second threaded portion, and wherein the first threaded portion includes a clutching slot. If desired, the housing of the adjuster may be integrally formed as part of the lamp housing.

The adjuster and lamp assembly can have several advantages over existing adjusters and lamp assemblies. Most significantly, the adjuster can be adjusted from more than one adjustment point, and regardless of which adjustment point is used, the adjuster can include a clutching feature that allows the adjuster to clutch at any point along the travel path of the output shaft. The multiple adjustment points allow the adjuster to be used in a variety of applications, and the clutching feature protects against damage to the adjuster and lamp. Each of the adjustment points can mate with a conventional driver, making the use of the adjuster even more flexible. In addition, the clutching feature is augmentable by stop features to further prevent damage to the adjuster device and components coupled therewith.

In at least one embodiment, a lamp adjuster is provided that includes: a housing having a first adjustment point and a nose; a gear having an extended cylindrical portion, the extended cylindrical portion disposed at least partially within the housing and having an at least partially threaded interior; an output shaft disposed longitudinally and at least partially, within the housing and the extended cylindrical portion, the output shaft having a first threaded portion at a first end, a ball stud disposed at a second end, and a second threaded portion situated therebetween; a first channel extending longitudinally along the output shaft and having a first retraction stop adjacent to the second end; a first housing tang extending from the nose into the first channel of the output shaft, wherein upon longitudinal retraction of the output shaft into the housing to a first terminal stop point via rotational force applied to the gear, the first retraction stop engages the first housing tang to prevent further retraction of the output shaft into the housing beyond the first terminal stop point, wherein the first threaded portion has a major thread diameter greater than a major thread diameter of the second threaded portion, and the first and second threaded portions functionally engage the at least partially threaded interior of the extended cylindrical portion; and a clutching slot provided at the first threaded portion to allow for selective disengagement of the first threaded portion from the partially threaded interior.

In at least another embodiment, a lamp adjuster is provided that includes: a housing having a first adjustment point and a nose; a gear having an extended cylindrical portion, the extended cylindrical portion disposed at least partially within the housing and having an at least partially threaded interior; an output shaft disposed longitudinally and at least partially, within the housing and the extended cylindrical portion, the output shaft having a first threaded portion at a first end, a ball stud disposed at a second end, and a second threaded portion situated therebetween; a channel extending longitudinally along the output shaft; a housing tang extending into the channel of the output shaft to prevent rotation of the output shaft relative to the housing; an extension stop extending from the output shaft, wherein upon longitudinal extension of the output shaft out of the housing to a first terminal stop point, the extension stop engages the housing tang to prevent further extension of the output shaft from the housing beyond the first terminal stop point, wherein the first threaded portion has a major thread diameter distinct from a major thread diameter of the second threaded portion, and the first and second threaded portions functionally engage the at least partially threaded interior of the extended cylindrical portion; and a clutching slot provided at the first threaded portion to allow for at least partial disengagement of the first threaded portion from the partially threaded interior.

In at least another embodiment, a lamp for a vehicle is provided that includes: a lamp housing; a lens supported by the housing; a reflector supported by the housing; a bulb disposed between the lens and the reflector; and an adjuster functionally engaged to the reflector, the adjuster including: a housing having a first adjustment point and a nose; a gear having an extended cylindrical portion, the extended cylindrical portion disposed at least partially within the housing and having an at least partially threaded interior; an output shaft disposed longitudinally and at least partially, within the housing and the extended cylindrical portion, the output shaft having a first threaded portion, a ball stud, and a second threaded portion in abutment with the first threaded portion; a channel extending longitudinally along the output shaft; a housing tang extending into the channel of the output shaft to prevent rotation of the output shaft relative to the housing; an extension stop extending from the output shaft, wherein upon longitudinal extension of the output shaft outward from the housing to a first terminal stop point, the extension stop engages the housing tang to prevent further traversal of the output shaft from the housing beyond the first terminal stop point, and wherein the channel further includes a retraction stop, and upon longitudinal retraction of the output shaft into the housing to a second terminal stop point, the retraction stop engages the housing tang to prevent further traversal of the output shaft into the housing beyond the second terminal stop point; and wherein the first threaded portion has a major thread diameter distinct from a major thread diameter of the second threaded portion, and the first and second threaded portions functionally engage the at least partially threaded interior of the extended cylindrical portion; and a clutching slot provided at the first threaded portion to allow for selective compression of the first threaded portion.

While one possible application of the lamp adjuster is in connection with a vehicle lamp, many other applications are possible and references to use in connection with a vehicle lamp should not be deemed to limit the uses of the lamp adjuster. For example, the lamp adjuster can be used to adjust components coupled thereto that are not associated with a lamp. The terms used herein should not be interpreted as being limited to specific forms, shapes, or compositions. Rather, the parts may have a wide variety of shapes and forms and may be composed of a wide variety of materials. These and other objects and advantages of the lamp adjuster will become apparent from the detailed description, claims, and accompanying drawings.

DESCRIPTION OF THE DRAWINGS

Embodiments of the lamp adjuster are disclosed with reference to the accompanying drawings and are for illustrative purposes only. The device and method of use are not limited in their application to the details of construction or the arrangement of the components illustrated in the drawings. The lamp adjuster is capable of other embodiments or of being practiced or carried out in other various ways. In the drawings:

FIG. 4 is a cross-sectional view of the gear and output shaft of FIG. 1, taken along plane 4-4 of FIG. 1;

FIG. 5 is an exploded, partial cross-sectional view of the gear and output shaft of FIG. 4;

DETAILED DESCRIPTION OF THE PREFERRED EMBODIMENTS

Figure 1:
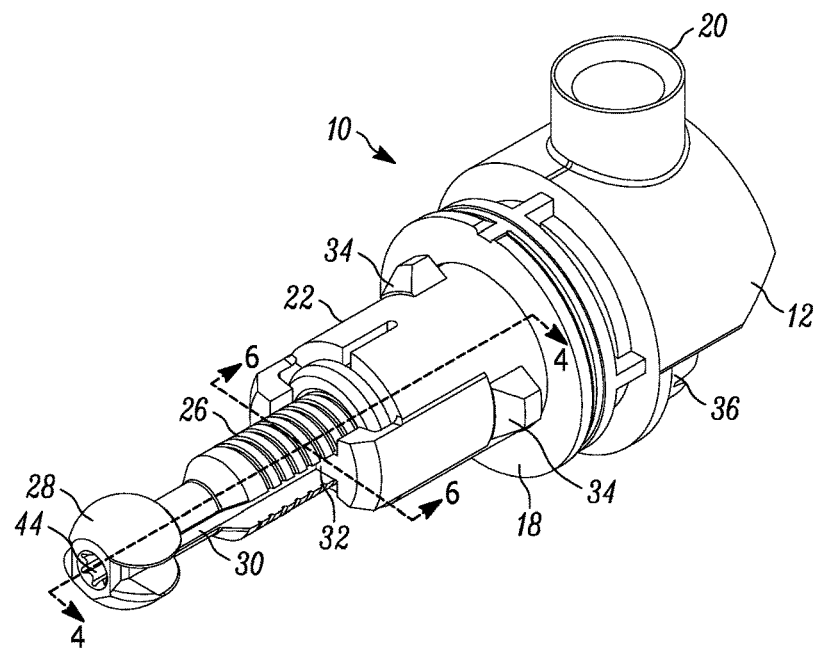
FIG. 1 is a front perspective view of an exemplary lamp adjuster.
Figure 2:
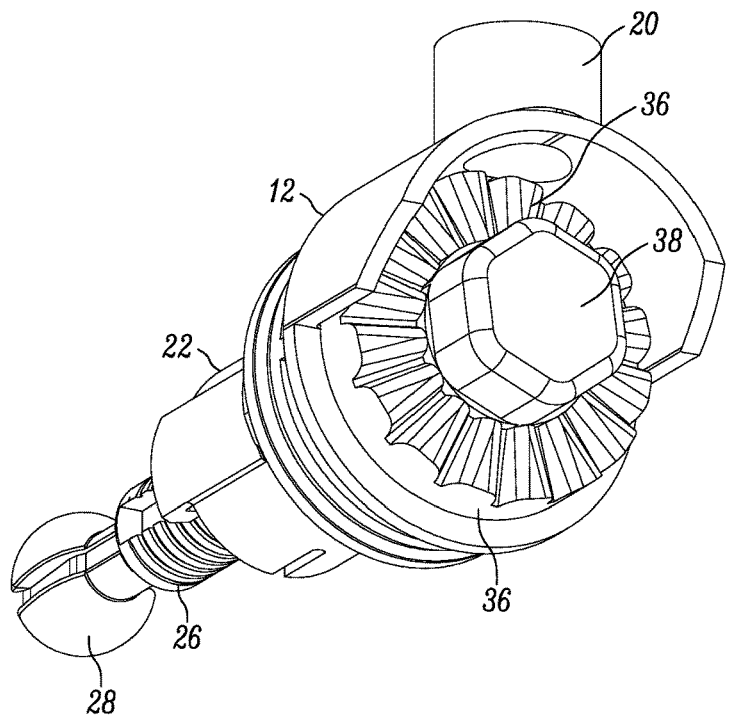
FIG. 2 is a rear perspective view of the adjuster of FIG. 1.
Figure 3:
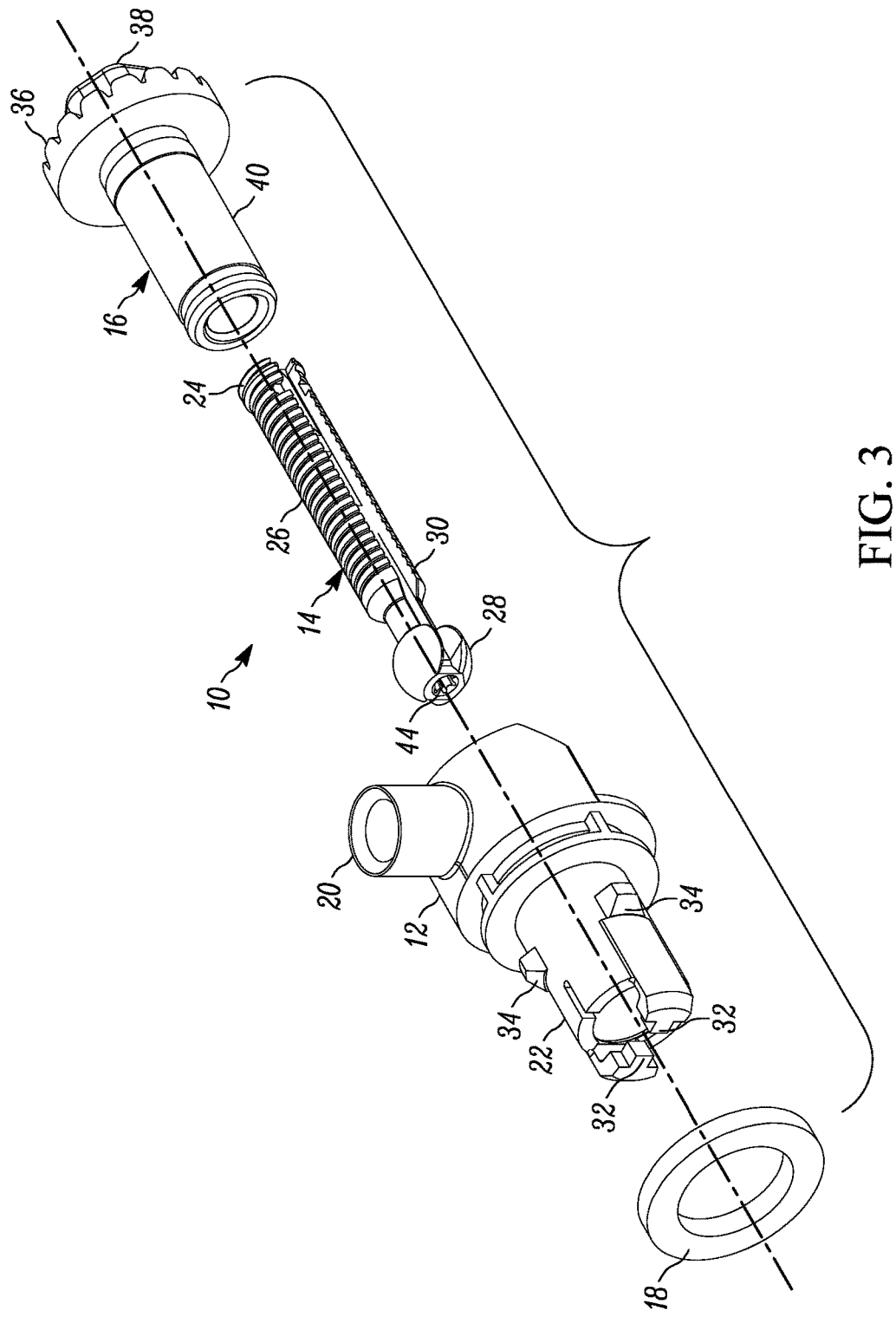
FIG. 3 is an exploded perspective view of the adjuster of FIG. 1.
Figure 6:
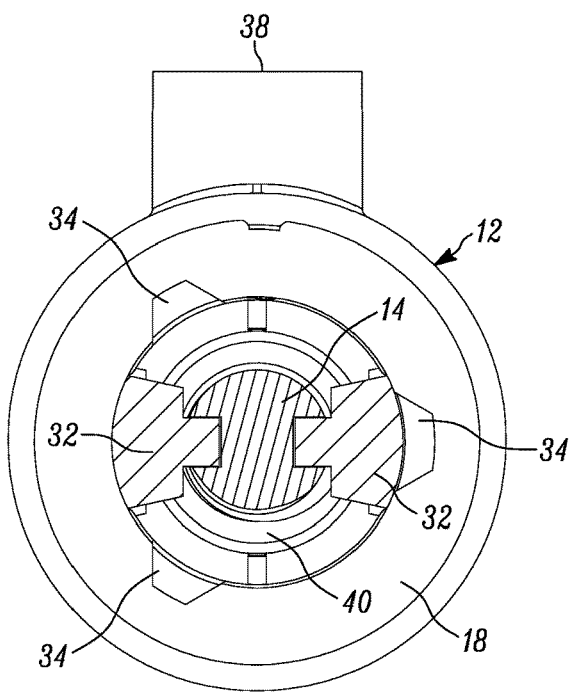
FIG. 6 is a cross-sectional view of the adjuster of FIG. 1, taken along plane 6-6 of FIG. 1.
Figure 7:
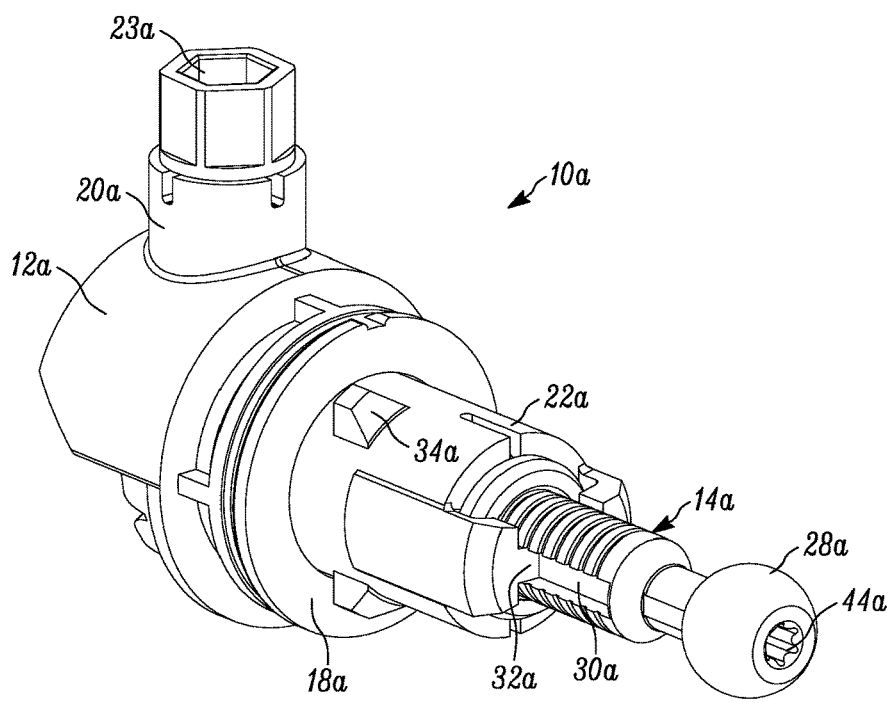
FIG. 7 is a front perspective view of another exemplary embodiment of the adjuster.
Figure 8:
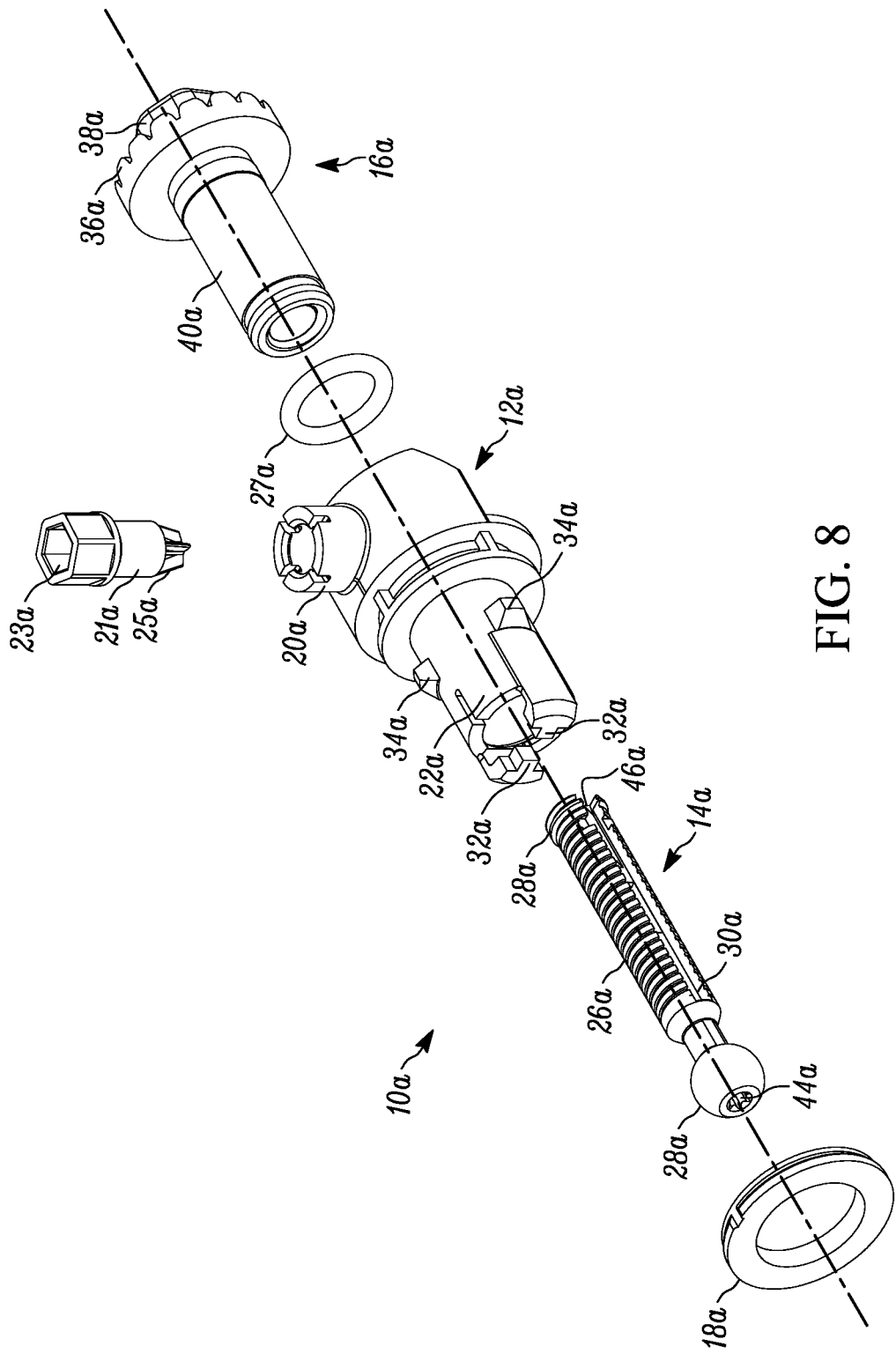
FIG. 8 is an exploded front perspective view of the adjuster of FIG. 7.
Figure 9:
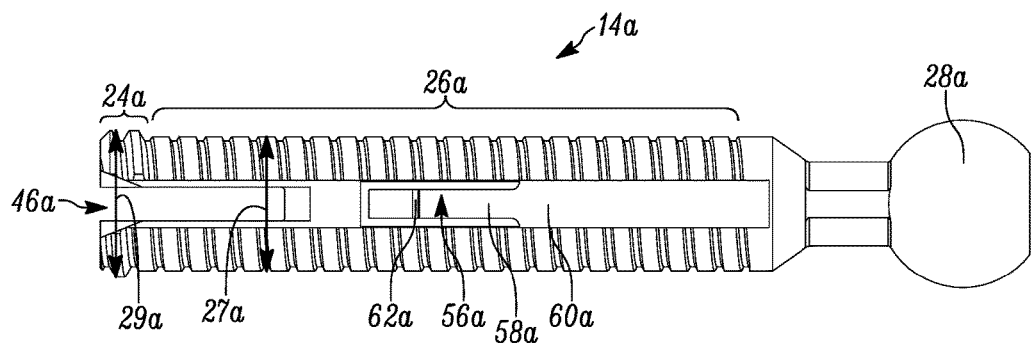
FIG. 9 is a side view of the output shaft of the adjuster of FIG. 7.

Referring now to the drawings, a lamp adjuster 10 according to at least one embodiment, includes a housing 12, an output shaft 14, a gear 16, and a gasket 18. The housing 12 includes an input boss 20 and a nose 22 having a set of housing tangs 32 and a set of tabs 34. The output shaft 14 includes a first threaded portion 24 at one end thereof, a second threaded portion 26 adjacent the first threaded portion 24, a ball stud 28 having a recess 44 and disposed at the other end thereof, and one or more channels 30 (a first channel and a second channel are shown) that runs along the length of the output shaft 14. The second threaded portion 26 has a smaller major thread diameter 27 than the major thread diameter 29 of the first threaded portion 24, and the first threaded portion 24 has a clutching slot 46 formed therein, as is best shown in FIG. 5. The gear 16 has gear teeth 36, a head 38, and an extended cylindrical portion 40. As best shown in FIGS. 4 and 5, the extended cylindrical portion 40 has internal threads 42 along its length.

In at least some embodiments, to assemble the adjuster 10, several methods could be used, however the following method has been found to be particularly effective. The gasket 18 is first placed around the nose 22 of the housing 12 and snapped past tabs 34, which secure the gasket 18 in place. The gasket 18 will serve as a seal between the adjuster 10 and the lamp assembly or mounting hardware in which it is installed. The output shaft 14 is then driven into the extended cylindrical portion 40 of the gear 16 to a desired pre-set position dictated by the lamp assembly and vehicle in which the adjuster 10 will be installed. The recess 44 in ball stud 28 of the output shaft 14 can be used to drive the output shaft 14. The recess 44 preferably accepts a TORX® head driver, but other driving tools could of course also be used, and the ball stud 28 could be driven without the assistance of a recess 44. The first threaded portion 24 of the output shaft 14 engages the threads 42 of the extended cylindrical portion 40 of the gear 16 as the output shaft 14 is driven into the gear 16. The first threaded portion 24 and the threads 42 are in a fully threaded, mating engagement, while the second threaded portion 26 and the threads 42 are in a limited mating engagement because the second threaded portion 26 has a smaller major diameter than the first threaded portion 24. To continue assembly of the adjuster 10, a second gasket (not shown) can be placed around the extended cylindrical portion 40 of the gear 16 to create a seal between the housing 12 and the gear 16. Then, the output shaft-gear 14-16 subassembly is pressed into housing 12 such that the ball stud 28 end of the output shaft 14 extends from the nose 22 of the housing 12 and the housing tangs 32 are disposed in the channel 30 of the output shaft 14. The adjuster 10 can then be installed in a lamp assembly (not shown) such that the ball stud 28 of the output shaft 14 functionally engages the lamp.

Once installed, the adjuster 10 can be used to adjust the lamp. An operator can choose between at least two different points of adjustment using the adjuster 10. A driver can be inserted into the input boss 20 on the top of the housing 12 to mate with the gear teeth 36. A driver with a Phillips #2 drive bit works well in this application, but other drivers could also be used. The gear teeth 36 can be designed to accommodate a number of different drivers as well. As the selected driver is turned, the gear 16 rotates. Because the output shaft 14 is in threaded engagement with the gear 16 but prevented from rotation by the housing tangs 32 disposed within channel 30, the rotation of the gear 16 causes the output shaft 14 to translate linearly. The linear translation of the output shaft 14 effects adjustment of the lamp. Alternatively, the driver or other input shaft could be permanently positioned within the housing 12. An operator can also use the head 38 of the gear 16 to effect adjustment. The head 38 is preferably hexagon-shaped to mate with a ½" hex socket, but other shapes and tools could also be used to turn the head 38. Turning the head 38 turns the gear 16, which, in the same manner described above, causes the output shaft 14 to translate linearly, thereby effecting adjustment of the lamp. Thus, the adjuster 10, in at least some embodiments, can be adjusted in two different ways, from two different adjustment points. In the embodiments shown, the adjustment points are oriented perpendicular to one another, which will allow the adjuster to be used in a wide range of applications, however, the adjustment points could be positioned at other locations and angles with respect to one another as well.

Using either adjustment method, the adjuster 10 includes a clutching feature to prevent damage to the adjuster as a result of over-adjustment, excessive torque application, or other resistance to the linear movement of the output shaft 14. The difference between the major thread diameters of the first threaded portion 24 and the second threaded portion 26 combined with the clutching slot 46 disposed within the first threaded portion 24 allow the output shaft 14 to clutch along the entire length of travel, regardless of which adjustment point is used. As previously described, the major thread diameter of the first threaded portion 24 is larger than that of the second threaded portion 26. The first threaded portion 24 spans a smaller section of the length of the output shaft 14 as well. For example, as shown in FIG. 5, the first threaded portion 24 may contain only a few threads, while the second threaded portion may contain about twenty threads. One possible major thread diameter for the first threaded portion 24 is ⅜", and more specifically a ⅜-16 UNC Class 3A thread. Other numbers, diameters and types of threads for each portion 24, 26 could also be used as necessary for each application. It is also possible to use an unthreaded portion in place of the second threaded portion 26, however, a second threaded portion 26 is preferable, as described below, to support the output shaft 14 in the extended cylindrical portion 40 and prevent side-to-side deflection of the output shaft 14.

In operation, the first threaded portion 24 is in full thread-to-thread engagement with the threads 42, and the second threaded portion 26 is minimally engaged with threads 42 to provide adequate support between the second threaded portion 26 and the internal threads 42 to minimize side-to-side deflection of the output shaft 14. When the adjuster is over-adjusted, or subjected to excessive torque or force at any point along the output shaft 14, the clutching slot 46 in the first threaded portion 24 allows the first threaded portion 24 to flex inward and disengage from the threads 42 and thereby prevent damage to the adjuster or lamp. Once the excessive torque or load is relieved, the first threaded portion 24 flexes back outward to reengage the threads 42. This engagement and disengagement can occur at any point as the output shaft 14 travels forward and backward in the extended cylindrical portion 40 of the gear 16. Thus, the adjuster 10 is protected not only from excessive torque or loads applied when the output shaft 14 is at either end of the travel path, but at any time an excessive torque or load is applied.

Referring now to FIGS. 7-13, another exemplary embodiment of the lamp adjuster is illustrated and identified as adjuster 10a. Similar to adjuster 10, adjuster 10a includes a housing 12a, an output shaft 14a, a gear 16a, and a gasket 18a. The housing 12a includes an input boss 20a and a nose 22a having a set of housing tangs 32a and a set of tabs 34a. The output shaft 14a includes a first threaded portion 24a at one end thereof, a second threaded portion 26a adjacent the first threaded portion 24a, a ball stud 28a having a recess 44a and disposed at the other end thereof, and one or more channels 30a that run along the length of the output shaft 14a. In at least one embodiment the output shaft 14a includes a pair of opposing channels (FIGS. 11 and 13), while in other embodiments, more or less channels 30a in other positions can be situated along the output shaft 14a. The second threaded portion 26a has a smaller major thread diameter 27a than the major thread diameter 29a of the first threaded portion 24a, and the first threaded portion 24a also has a clutching slot 46a formed therein. The gear 16a has teeth 36a, a head 38a, and an extended cylindrical portion 40a.

Figure 11:
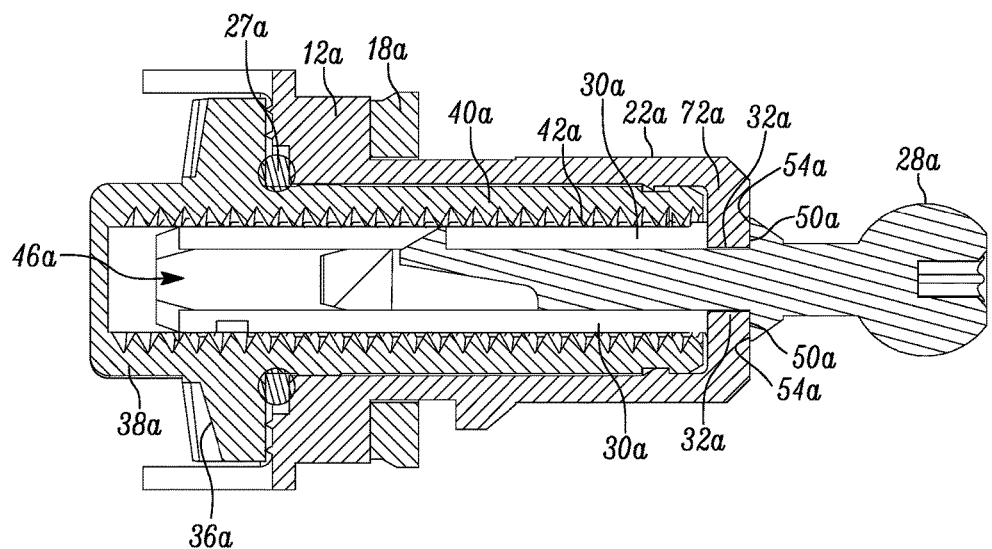
FIG. 11 is a cross-sectional view of the adjuster as shown in FIG. 10, taken along plane 11-11 of FIG. 10.
Figure 13:
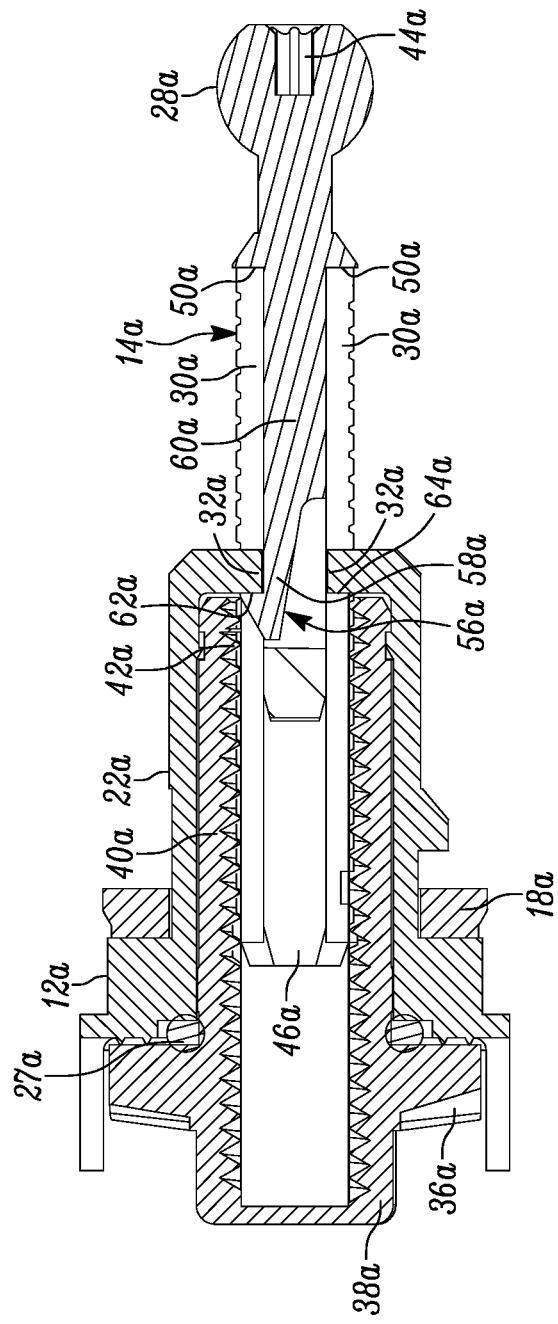
FIG. 13 is a cross-sectional view of the adjuster as shown in FIG. 12, taken along plane 13-13 of FIG. 12.

As best shown in FIGS. 11 and 13, the extended cylindrical portion 40a has internal threads 42a along its length. An input shaft 21a having an engagement portion 23a and input teeth 25a is positioned inside the input boss 20a, such that the input teeth 25a engage the teeth 36a of the gear 16a. Because the output shaft 14a is in threaded engagement with the teeth 36a of the gear 16a, but prevented from rotation by the housing tangs 32a disposed within channels 30a, the rotation of the gear 16a causes the output shaft 14a to translate linearly through the nose 22a (similar to as described above with regard to adjuster 10).

The adjuster 10a further includes the clutching feature as described above with regard to adjuster 10, which utilizes the clutching slot 46a to allow the first threaded portion 24a to flex inward and disengage from the extended cylindrical portion 40a in response to excessive resistance to linear movement at any point along the travel path of the output shaft 14a. Although the adjuster 10a includes many aspects of the adjuster 10, with regard to function and form, the adjuster 10a further includes stop features that operate in conjunction with the clutching feature to protect the adjuster and devices connected thereto, as well as enhance the effectiveness of the clutching feature. The stop features include a retraction stop and an extension stop, which prevent over-retraction and over-extension of the output shaft 14a relative to the housing 12a.

As shown best in FIGS. 11 and 13, one or more retraction stops 50a are provided along the output shaft 14a, with at least one channel 30a having a retraction stop 50a therein. The retraction stops 50a can vary in shape and size, although in at least one embodiment they are situated perpendicular or substantially perpendicular to the length of the channel 30a. The longitudinal position of the retraction stops 50a along the output shaft 14a is indicative of a retraction terminal stop point.

Figure 10:
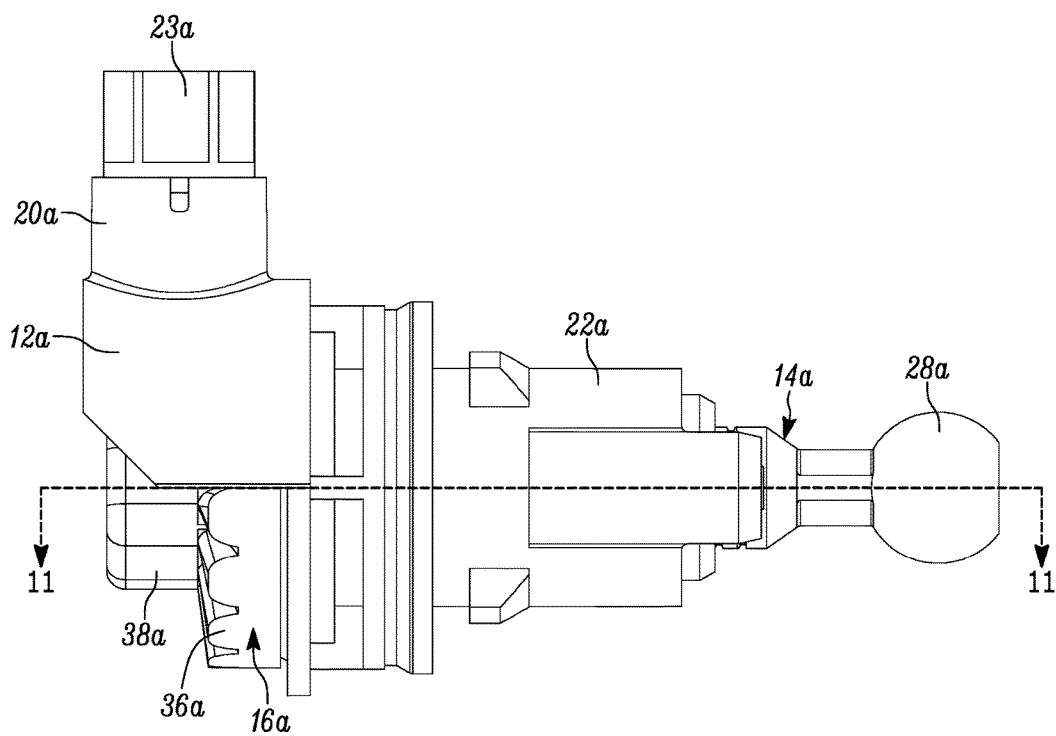
FIG. 10 is a side view of the adjuster of FIG. 7 with the output shaft in a retracted position.

As shown in FIGS. 10 and 11, when the output shaft 14a is retracted through the nose 22a to the end of the channels 30, the retraction stops 50a engage the front walls 54a of the housing tangs 32a. This engagement crates a linear force resistance that causes the clutching feature to be activated. Preventing the output shaft 14a from being further retracted through the nose 22a and initiating the clutching feature prevents damage to the adjuster 10a and/or to structures (e.g., lamp, lamp assemblies, vehicle body, etc.) attached to the ball stud 28a (or to the housing 12a) via over-retraction.

Figure 12:
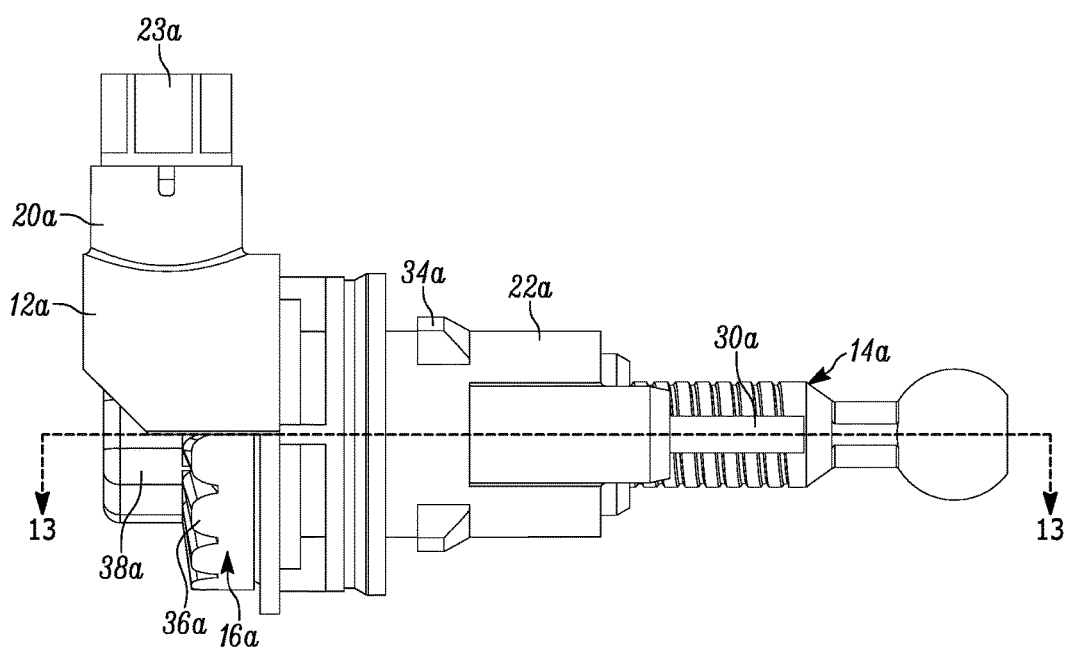
FIG. 12 is a side view of the adjuster of FIG. 7 with the output shaft in an extended position.

Referring now to FIGS. 12 and 13, the adjuster 10a is shown with the output shaft 14a fully extended from the nose 22a. In contrast to the adjuster 10, adjuster 10a includes one or more extension stops 56a. In at least some embodiments, the extension stop 56a is comprised of an arm 58a that extends from a central portion 60a of the output shaft 14a and provides an outward spring force towards the housing tang 32a. The arm 58a includes a stop tab 62a that engages a rear wall 64a of the housing tangs 32a when the output shaft 14a is extended through the nose 22a. The longitudinal position of the stop tab 62a along the output shaft 14a is indicative of an extension terminal stop point. This engagement prevents the output shaft 14a from further extension through the nose 22a and causes the clutching feature to be activated, preventing damage to the adjuster 10a and/or to structures attached thereto. In addition, over-extension of the output shaft 14a is prevented, which could otherwise lead to disengagement of the output shaft 14a from the adjuster gear 40a. In at least some other embodiments, the extension stop 56a can take various other forms, including shapes and sizes, such that an engagement between the output shaft 14a and the housing 12a is created to prevent further extension of the output shaft 14a from the nose 22a.

The housings 12, 12a, output shafts 14, 14a and gears 16, 16a can be manufactured from plastic materials, making them very lightweight and inexpensive to produce. Other materials could also be used, such as metal and composite materials, but lightweight and inexpensive materials are preferred. The gaskets can be manufactured from a number of different materials, including rubber and silicone materials.

The adjusters 10, 10a may have other applications aside from use in connection with vehicle lamp assemblies. Although the adjusters are shown and described in what is perceived to be the most practical and preferred embodiments, it is to be understood that they are not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

I claim:

1. A lamp adjuster comprising:
    a housing having a first adjustment point and a nose;
    a gear having an extended cylindrical portion, the extended cylindrical portion disposed at least partially within the housing and having an at least partially threaded interior;
    an output shaft disposed longitudinally and at least partially, within the housing and the extended cylindrical portion, the output shaft having a first threaded portion at a first end, a ball stud disposed at a second end, and a second threaded portion situated therebetween;
    a first channel extending longitudinally along the output shaft and having a first retraction stop adjacent to the second end;
    a first housing tang extending from the nose into the first channel of the output shaft, wherein upon longitudinal retraction of the output shaft into the housing to a first terminal stop point via rotational force applied to the gear, the first retraction stop engages the first housing tang to prevent further retraction of the output shaft into the housing beyond the first terminal stop point, wherein the first threaded portion has a major thread diameter greater than a major thread diameter of the second threaded portion, and the first and second threaded portions functionally engage the at least partially threaded interior of the extended cylindrical portion; and
    a clutching slot provided at the first threaded portion to allow for selective disengagement of the first threaded portion from the partially threaded interior.

2. The lamp adjuster of claim 1, wherein the output shaft further includes an extension stop extending therefrom, wherein upon longitudinal extension of the output shaft out of the housing to a second terminal stop point, the extension stop engages the first housing tang to prevent further extension of the output shaft from the housing beyond the second terminal stop point.

3. The lamp adjuster of claim 2, wherein the extension stop engages a rear wall of the first housing tang.

4. The lamp adjuster of claim 3, wherein the first retraction stop engages a front wall of the first housing tang.

5. The lamp adjuster of claim 2, further comprising a second channel extending longitudinally along the output shaft and having a second retraction stop adjacent to the second end.

6. The lamp adjuster of claim 5, further comprising a second housing tang extending from the nose into the second channel, wherein upon longitudinal retraction of the output shaft into the housing to the first terminal stop point, the second retraction stop engages the second housing tang to prevent further retraction of the output shaft into the housing beyond the first terminal stop point.

7. The lamp adjuster of claim 6, wherein the extension stop includes an arm that extends from a central portion of the output shaft to provide an outward spring force towards the first housing tang.

8. The lamp adjuster of claim 7, wherein the extension stop further includes a stop tab that is perpendicular to a longitudinal length of the output shaft.

9. The lamp adjuster of claim 8, wherein the first adjustment point is at least one, of an input boss for receiving a driver and an input shaft having an engagement portion for engagement with the driver.

10. The lamp adjuster of claim 5, wherein the first channel is diametrically opposed to the second channel.

11. The lamp adjuster of claim 2, wherein a second adjustment point is provided for rotational engagement with the gear, and the first and second adjustment points are positioned perpendicular to one another.

12. The lamp adjuster of claim 2, wherein the clutching slot at least partially bisects the first threaded portion and allows a portion of the output shaft to flex inwardly in response to excessive resistance to linear movement.

13. The lamp adjuster of claim 2, wherein the first threaded portion and the extended cylindrical portion are in full thread-to-thread engagement and the second threaded portion and the extended cylindrical portion are in minimal thread-to-thread engagement.

14. A lamp adjuster comprising:
a housing having a first adjustment point and a nose;
a gear having an extended cylindrical portion, the extended cylindrical portion disposed at least partially within the housing and having an at least partially threaded interior;
an output shaft disposed longitudinally and at least partially, within the housing and the extended cylindrical portion, the output shaft having a first threaded portion at a first end, a ball stud disposed at a second end, and a second threaded portion situated therebetween;
a channel extending longitudinally along the output shaft;
a housing tang extending into the channel of the output shaft to prevent rotation of the output shaft relative to the housing;
an extension stop extending from the output shaft, wherein upon longitudinal extension of the output shaft out of the housing to a first terminal stop point, the extension stop engages the housing tang to prevent further extension of the output shaft from the housing beyond the first terminal stop point, wherein the first threaded portion has a major thread diameter distinct from a major thread diameter of the second threaded portion, and the first and second threaded portions functionally engage the at least partially threaded interior of the extended cylindrical portion; and
a clutching slot provided at the first threaded portion to allow for at least partial disengagement of the first threaded portion from the partially threaded interior.

15. The lamp adjuster of claim 14, the channel further includes a retraction stop and upon longitudinal retraction of the output shaft into the housing to a second terminal stop point, the retraction stop engages the housing tang to prevent further retraction of the output shaft into the housing beyond the second terminal stop point.

16. The lamp adjuster of claim 15, wherein the clutching slot at least partially bisects the first threaded portion to allow a portion of the output shaft to flex inwardly in response to excessive resistance to linear movement generated as a result of the output shaft reaching at least one of the first terminal stop point and the second terminal stop point.

17. The lamp adjuster of claim 16, wherein the first threaded portion and the extended cylindrical portion are in full thread-to-thread engagement and the second threaded portion and the extended cylindrical portion are in minimal thread-to-thread engagement.

18. The lamp adjuster of claim 17, wherein the extension stop engages a rear wall of the housing tang.

19. The lamp adjuster of claim 18, wherein the retraction stop engages a front wall of the housing tang.

20. A lamp for a vehicle, the lamp comprising:
a lamp housing;
a lens supported by the housing;
a reflector supported by the housing;
a bulb disposed between the lens and the reflector; and
an adjuster functionally engaged to the reflector, the adjuster including:
a housing having a first adjustment point and a nose;
a gear having an extended cylindrical portion, the extended cylindrical portion disposed at least partially within the housing and having an at least partially threaded interior;
an output shaft disposed longitudinally and at least partially, within the housing and the extended cylindrical portion, the output shaft having a first threaded portion, a ball stud, and a second threaded portion in abutment with the first threaded portion;
a channel extending longitudinally along the output shaft;
a housing tang extending into the channel of the output shaft to prevent rotation of the output shaft relative to the housing;
an extension stop extending from the output shaft, wherein upon longitudinal extension of the output shaft outward from the housing to a first terminal stop point, the extension stop engages the housing tang to prevent further traversal of the output shaft from the housing beyond the first terminal stop point, and wherein the channel further includes a retraction stop, and upon longitudinal retraction of the output shaft into the housing to a second terminal stop point, the retraction stop engages the housing tang to prevent further traversal of the output shaft into the housing beyond the second terminal stop point; and
wherein the first threaded portion has a major thread diameter distinct from a major thread diameter of the second threaded portion, and the first and second threaded portions functionally engage the at least partially threaded interior of the extended cylindrical portion; and a clutching slot provided at the first threaded portion to allow for selective compression of the first threaded portion.

\* \* \* \* \*